United States Patent [19]

Orr

[11] Patent Number: 5,268,228
[45] Date of Patent: Dec. 7, 1993

[54] GROOVED PRESSURE-SENSITIVE ADHESIVE TAPE

[75] Inventor: Robert B. Orr, Wilmington, Del.

[73] Assignee: Norwood Industries, Inc., Frazer, Pa.

[21] Appl. No.: 948,209

[22] Filed: Sep. 21, 1992

[51] Int. Cl.⁵ .............................................. B32B 9/00
[52] U.S. Cl. ...................................... 428/343; 428/40; 428/143; 428/147; 428/158; 428/317.3
[58] Field of Search .................. 428/40, 143, 354, 159, 428/158, 317.3, 343, 147

[56] References Cited

U.S. PATENT DOCUMENTS

| | | | |
|---|---|---|---|
| 3,615,992 | 10/1971 | Jeffries et al. | 156/154 |
| 4,113,792 | 9/1978 | Pastor et al. | 260/834 |
| 4,170,612 | 10/1979 | Pastor et al. | 525/101 |
| 5,130,185 | 7/1992 | Ness | 428/40 |
| 5,141,790 | 8/1992 | Calhoun et al. | 428/40 |
| 5,157,101 | 10/1992 | Orr | 528/74.5 |

*Primary Examiner*—Patrick J. Ryan
*Assistant Examiner*—Abraham Bahta
*Attorney, Agent, or Firm*—Webb, Burden, Ziesenheim & Webb

[57] ABSTRACT

A double-sided adhesive-coated foam tape particularly for bonding two adjacent rigid surfaces in which fine grooves on one or both sides of the tape facilitate air venting to minimize non-contact areas. The tape is used by affixing one side of the tape—the non-grooved side if only one side of the tape is grooved—to a first rigid surface to be adhered, removing the release liner from the grooved tape surface and pressing onto the grooved tape the second rigid surface intended for bonding. The grooves in the tape are fine enough that, once the two surfaces to be bonded are in position, the grooves largely or completely disappear.

19 Claims, 1 Drawing Sheet

GROOVED PRESSURE-SENSITIVE ADHESIVE TAPE

FIELD OF THE INVENTION

The present invention is a double-sided adhesive-coated foam tape for use as a fastener in the automotive and in other industries.

BACKGROUND OF THE INVENTION

Just as the traditional use of metal alloys in automotive manufacturing is increasingly being supplanted by composites and other polymer-containing materials, the use of mechanical fasteners in car manufacturing is steadily being replaced by polymeric bonding. The industrial realities of these trends are well-known, and include engineering considerations of weight and fuel efficiency, cost and ease of manufacturing, aesthetic preferences in some cases and other reasons. At this writing it has been years since any given new automobile, chosen at random, did not contain significant polymer-based and polymer-bonded parts among not only its ornamental but its structural components.

With the shift from mechanical fastening to polymeric bonding, it is only natural that the use of polymeric bonding led to certain unique problems. For example, it has already been documented that when side molding is bonded to the side panel of an automobile by means of certain polymeric bonding agents, the side molding is less securely bonded to the side panel of the automobile if the automobile is manufactured in the winter rather than in the summer. Also, when prefabricated, rigid parts are bonded with a double-sided pressure-sensitive adhesive tape, it is difficult to achieve uniform mating of the rigid surfaces with the adhesive surfaces. The following test illustrates this latter difficulty.

When two sheets of glass are mated with a one-half inch wide, thin, double-sided adhesive tape, surface contact is reasonably complete. When the adhesive tape width is increased to one inch, however, the placement of the double-sided adhesive tape between two flat pieces of glass results in about 10% to 60% of the glass/adhesive surface constituting non-contact zones, or "bubbles." These bubbles are easily viewed through the clear glass. Pressure exerted to attempt to force the glass panels together does not eliminate the bubbles, that is, does not increase the actual contact area of the adhesive/glass mating surfaces.

Just as the auto manufacturers report, heat contributes toward solving this non-contact problem, and when glass surfaces are abutted against a one-inch wide adhesive tape at 140° F., reduced non-contact zones or bubbles result as compared to when glass surfaces are bonded at ambient (70° F.) temperature. While measures to provide some warming of the contact surfaces are used, further improvement in the reliability of bonding is sought. One of the methods being pursued is by providing improved mating of the surfaces being bonded.

Notwithstanding the non-contact problem, the use of double-sided pressure-sensitive adhesive tapes in bonding adjacent rigid surfaces offers several advantages over the use of other polymeric bonding agents. Epoxy compositions and other polymers which are applied wet to such surfaces, with subsequent curing, require extra time and ventilation equipment which the use of double-sided pressure-sensitive adhesive tapes avoids. Also, it is far easier to control the amount of polymeric bonding agent between two rigid surfaces, by the use of a tape, than with a liquid or viscous bonding agent, which must be laboriously metered and applied evenly and even then is difficult to apply to specifications.

A need therefore remains for an improved double-sided adhesive tape for use in the automotive industry, which tape will reduce the problem of unwanted non-contact areas when the tape is used to bond adjacent rigid surfaces.

SUMMARY OF THE INVENTION

In order to meet this need, the present invention is a double-sided adhesive-coated foam tape in which fine grooves on one or both sides facilitate air venting to minimize non-contact areas between two rigid surfaces. The tape is used by affixing one side of the tape—the non-grooved side if only one side of the tape is grooved—to a first rigid surface to be adhered, removing the release liner from the grooved adhesive surface and pressing onto the grooved adhesive the second rigid surface intended for bonding. The more flexible tapes can readily be applied to the first rigid surface with essentially complete contact. The grooves in the tape are fine enough that, once the two surfaces to be bonded are in position, the grooves largely disappear: if such a tape were to be viewed through a transparent panel the grooves would be barely perceptible or almost invisible. The resultant bond exhibits reduced non-contact area.

DETAILED DESCRIPTION OF THE INVENTION

For use in the automotive industry, and also for use in other applications, the present invention is a double-sided adhesive-coated foam tape in which fine grooves on one or both of the tape surfaces facilitate air venting in the bonding of two adjacent rigid surfaces. The grooves are dimensioned so that they enable air venting but are fine enough that from the natural recovery of the tape the grooves largely fill in and disappear after bonding is complete. The combination of venting plus tape recovery yields minimized non-contact area between the adhesive and the bonded surfaces.

The use of a foam strip as the substrate for the present adhesive tape facilitates compression of the two rigid surfaces at the time of bonding. Thus the foam is preferably a flexible foam, although semi-rigid foams may have utility in certain applications. Foams may be open-celled or close-celled; or any intermediate combination of closed and open cells. The exemplary products are primarily closed-cell.

Pressure-sensitive adhesives suitable for use in the present invention are those which form a strong bond at room temperature, without further curing requirements such as application of heat, etc. Exemplary pressure-sensitive adhesive compositions are disclosed in U.S. Pat. Nos. 4,113,792 and 4,170,612 to Pastor et al., both of which are incorporated herein by reference. Another exemplary pressure-sensitive adhesive is disclosed in U.S. application Ser. No. 07/532,857 to Robert Orr. Other pressure-sensitive adhesives are known in the art which provide a strong bond—both good cohesion and good adhesion—at room temperature, and any of these known pressure-sensitive adhesives may be used also.

Release liners for use in the present invention may likewise be those known in the art. The release liners disclosed in U.S. Pat. No. 3,615,992, incorporated herein by reference, are suitable for use in the present invention, although the surfaces need not be abraded as is discussed in that patent. Polyorganosiloxane coated kraft paper is also a well-known release liner. Other release liners known in the art are also suitable as long as they are selected for their release characteristics relative to the pressure-sensitive adhesive chosen for use in the present invention.

Figure 1:
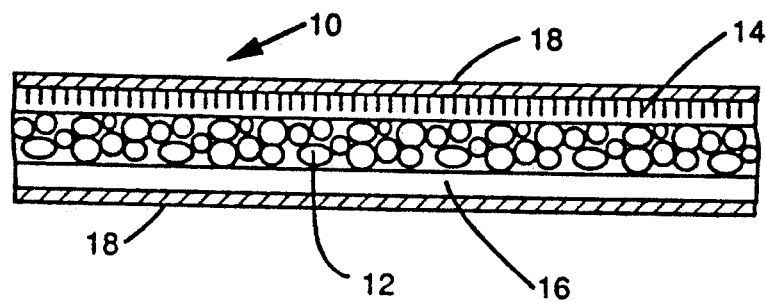
FIG. 1 is a section through the first embodiment of the double-sided adhesive-coated foam tape according to the present invention.

Referring now to FIG. 1, the first embodiment of a double-sided adhesive-coated foam tape according to the present invention is shown in section. This first embodiment includes grooves in one of the two tape surfaces. These grooves may also be seen in the liner if the tape is grooved with the liner in place. The next layer, adjacent to the liner, is an adhesive which may especially be a pressure-sensitive or alternate adhesive as described above.

The next layer of the product is the carrier and the support base for the sheet product.

The next layer is the adhesive provided on the second face of the carrier in order to form a product which can be used to bond two surfaces together. This adhesive layer also may be selected from the variety of examples noted above. It may be the same or different from the adhesive on the opposite face both in composition and in thickness. In commercial practice this adhesive face will usually be protected from casual contamination and impairment of properties by the product being rolled onto itself. Thus the lower adhesive face will rest on the opposite side of the liner from the top surface.

The substrate may be any of a number of foams or film materials. For the examples of this invention a cellular foam was used. Any material which will accept the application of a grooved adhesive or which can be semipermanently distorted by an embossing or other procedure may be substituted.

Grooves in the adhesive may be prepared by a number of manufacturing methods readily apparent to those skilled in the art. Hot or cold embossing in the desired groove pattern will render many sheet materials appropriately grooved. Alternatively, selective deposition of the adhesive on the foam substrate can be accomplished with appropriate transfer molds or with serrated rollers applied to the adhesive layer prior to the curing of the adhesive. Corresponding ridges may be provided to the release liners to help preserve the grooves during storage of the tapes.

Figure 2:
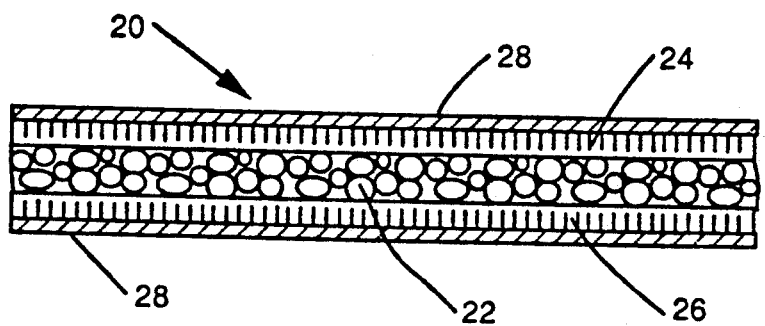
FIG. 2 is a section through a second embodiment of the double-sided adhesive-coated foam tape of the present invention.

Referring once again to FIG. 1, the double-sided adhesive-coated tape 10 includes a foam substrate layer 12, a layer of grooved adhesive 14, a layer of adhesive 16 without grooves and two release liners 18. In FIG. 2, the double-sided adhesive-coated tape 20 includes a foam substrate layer 22, two layers of grooved adhesive 24 and 26 and two release liners 28.

The invention will be further illustrated by, although it is not intended to be limited by, the following Example.

EXAMPLE I

A length of about 4" of Norwood Industries mounting tape was cut from a 1" wide roll. This specific tape, designated KC8545-50, was constructed using primarily closed-cell flexible polyurethane foam sheet about 1.1 mm thick as base. On each surface of the base foam, a coating of about 0.05 mm thick of an acrylic pressure-sensitive adhesive had been applied. A sheet based on 0.1 mm thick high density polyethylene had been laid onto one of the sticky surfaces to allow rolling the sticky sheet onto itself (allowing subsequent unrolling as the material is used) and to provide protection from dirt pick up or other contamination of the functional sticky surfaces.

The 4" length was laid, with the adhesive down, onto a piece of silicone coated release paper for protection. A straight edge was used to guide a rounded wooden stylus which was used to scribe lines, spaced about 4-5 mm, crosswise to the long dimension into the polyethylene protective sheet. This also resulted in rounded ditches being scribed into the underlying tape. In this case the hand pressure on the stylus was increased from the center of the tape toward the edges. While the exact depth of the rounded grooves varied, with the hand scribing, they were of the order of 0.07 to 0.15 mm deep with about the same width, at the edges of the tape.

The resulting effect of the presence of the grooves was measured using a test patterned after an automotive test, Society of Automotive Engineers—recommended practice, J 2215. This test uses transparent molded forms which simulate the components being mounted using double side coated mounting tape similar to the tape described in this Example. In essence the quality of a joint depends on minimum voids between the surfaces being joined. In our test we used two pieces of flat plate glass. As in the automotive test, the glass surfaces were waxed. This allows disassembly of the test piece. The unscribed side of the tape was removed from the release paper and the tape was smoothed onto one of the waxed plate glass surfaces. Invariably this smoothing resulted in 100% contact of tape to the glass surface. Then the polyethylene protective film was removed from the scribed surface of the tape and the second piece of waxed plate glass was pressed onto the tape surface. Next Scotch ® tape was put onto the exposed glass surface above the area where the mounting tape had been contacted. Pen or pencil lines were then traced around the total tape area and the included non-contact areas. These were always easily visible. These transparent tape tracings were then enlarged using a photocopier and a planimeter used to measure both the non-contact area and the total area. The percent non-contact area was calculated as 100× (non contact area/total area).

The percent non-contact area with tape that had been scribed measured, in two tests, at 2% and 6%. A control test, with no scribe marks, showed 16% non-contact area.

Using the same set of procedures as is described in Example 1, the following information was obtained.

| | | % Void Area | |
|---|---|---|---|
| Tape Type | Substrate | Test Sample | Control, Not Scribed |
| Norwood, KC7000 Series, 0.4 | Urethane | 20 | 27 |

| Tape Type | Substrate | Test Sample | Control, Not Scribed |
|---|---|---|---|
| Norwood, KC8000 Series, 0.4 to 1.6 mm Thick | Urethane | 24 | 41 |
| Norwood, KC8500 Series, 0.4 to 1.6 mm Thick | Urethane | 5 | 20 |
| Norwood, KC8800 Series, 0.4 to 1.6 mm Thick | Urethane | 11 | 21 |
| Norwood, KC9000 Series, 0.4 to 6.4 mm Thick | Urethane | 15 | 25 |

Alternative manufacturing and configurational techniques will be apparent to those skilled in the art apart from those delineated above. Therefore the invention is only to be limited as is set forth in the accompanying claims.

I claim:

1. A double-sided adhesive-coated tape comprising:
   a substrate;
   a layer of pressure-sensitive adhesive on each side of said substrate; and
   a plurality of grooves in at least one of said layers of pressure-sensitive adhesive.

2. The double-sided adhesive-coated tape according to claim 1 wherein said pressure-sensitive adhesive layers have a release liner adhered to the outer surface thereof.

3. The double-sided adhesive-coated tape as set forth in claim 2 wherein said substrate is a layer of foamed polymer.

4. The double-sided adhesive-coated tape as set forth in claim 2 wherein said substrate is a primarily open-celled foam.

5. The double-sided adhesive-coated tape according to claim 2 wherein said substrate is a primarily closed-cell foam.

6. The double-sided adhesive-coated tape according to claim 3 wherein said adhesive layers have a thickness between about 0.01 mm and about 0.1 mm.

7. The double-sided adhesive-coated tape according to claim 5 wherein said foam layer has a thickness between about 0.2 mm and about 15 cm.

8. The double-sided adhesive-coated tape according to claim 7 wherein said foam layer has a thickness of about 10 mm.

9. The double-sided adhesive-coated tape according to claim 8 wherein said adhesive layers are about 0.05 mm thick.

10. The double-sided adhesive-coated tape according to claim 9 wherein said release liner has a thickness between about 0.03 mm and about 1 mm.

11. The double-sided adhesive-coated tape according to claim 10 wherein said release liner has a thickness of about 0.1 mm.

12. The double-sided adhesive-coated tape according to claim 1 wherein said grooves run perpendicularly to the longitudinal dimension of the tape, and further wherein said grooves have a width of about 0.01–0.8 mm.

13. The double-sided adhesive-coated tape according to claim 12 wherein said grooves have a width of about 0.2 mm.

14. The double-sided adhesive-coated tape according to claim 13 wherein said grooves are spaced about 0.4 mm–1.0 cm apart.

15. The double-sided adhesive-coated tape according to claim 14 wherein said grooves are spaced about 5.0 mm apart.

16. A double-sided adhesive-coated tape comprising:
   a substrate layer comprising a flexible material further comprising a foam or film material, wherein said substrate is a tape base having as its longest dimension a length, as its shortest dimension a thickness and as its third dimension a width;
   a layer of pressure-sensitive adhesive on each side of said tape base; and
   a plurality of parallel grooves in each of said layers of pressure-sensitive adhesive wherein said grooves extend perpendicularly to said length of said tape base and create ridges of pressure-sensitive adhesive.
   wherein said grooves and said ridges are dimensioned wherein upon compressive contact of said ridges to a surface to be bonded said grooves vent any air trapped between said pressure-sensitive adhesive and said surface and simultaneously wherein said grooves largely disappear.

17. A double-sided adhesive-coated tape according to claim 16 wherein said grooves have a width and a depth between 0.01 and 0.8 mm and are spaced about 0.4 mm to 1.0 cm apart.

18. A double-sided adhesive-coated tape according to claim 17 wherein said grooves further have a width and a depth between 0.07 and 0.15 mm and are further spaced about 4–5 mm apart.

19. A double-sided adhesive-coated tape according to claim 18 wherein said substrate layer further comprises a foam material.

* * * * *